(12) United States Patent
Ripley

(10) Patent No.: US 10,195,631 B2
(45) Date of Patent: Feb. 5, 2019

(54) PAINT REPURPOSING SYSTEM

(71) Applicant: Christopher Barnard Ripley, Lichtfield, CT (US)

(72) Inventor: Christopher Barnard Ripley, Lichtfield, CT (US)

( * ) Notice: Subject to any disclaimer, the term of this patent is extended or adjusted under 35 U.S.C. 154(b) by 0 days.

(21) Appl. No.: 15/284,335

(22) Filed: Oct. 3, 2016

(65) Prior Publication Data

US 2017/0095828 A1 Apr. 6, 2017

Related U.S. Application Data

(60) Provisional application No. 62/237,372, filed on Oct. 5, 2015.

(51) Int. Cl.

| | | |
|---|---|---|
| *B05C 13/02* | (2006.01) | |
| *B05B 15/70* | (2018.01) | |
| *B05B 9/04* | (2006.01) | |
| *B05B 12/12* | (2006.01) | |
| *B05B 13/00* | (2006.01) | |
| *B05B 13/04* | (2006.01) | |
| *B32B 27/00* | (2006.01) | |
| *B05B 12/08* | (2006.01) | |

(52) U.S. Cl.
CPC ............. *B05B 15/70* (2018.02); *B05B 9/04* (2013.01); *B05B 12/12* (2013.01); *B05B 13/005* (2013.01); *B05B 13/041* (2013.01); *B05C 13/02* (2013.01); *B32B 27/00* (2013.01); *B05B 12/081* (2013.01); *B05B 12/084* (2013.01); *B05B 12/122* (2013.01)

(58) Field of Classification Search
CPC ............ B05B 15/10; B05B 9/04; B05C 13/02
See application file for complete search history.

(56) References Cited

U.S. PATENT DOCUMENTS

| | | | |
|---|---|---|---|
| 5,143,131 A * | 9/1992 | Seigneur | ............... B27B 17/025 |
| | | | 144/24.13 |
| 5,322,001 A | 6/1994 | Boda | |
| 6,096,132 A | 8/2000 | Kaiba et al. | |
| 6,467,978 B1 | 10/2002 | Tideman, Jr. | |
| 2004/0144873 A1* | 7/2004 | Johnston, Jr. | .......... A01K 45/00 |
| | | | 239/751 |
| 2005/0098101 A1 | 5/2005 | Shen et al. | |
| 2006/0275552 A1* | 12/2006 | Vendlinski | ............. B05B 13/04 |
| | | | 427/421.1 |
| 2010/0173090 A1* | 7/2010 | Davis | ..................... B05B 13/02 |
| | | | 427/427.3 |
| 2013/0189434 A1 | 7/2013 | Randall et al. | |
| 2014/0205217 A1* | 7/2014 | Avedissian | .............. B31B 19/16 |
| | | | 383/107 |

FOREIGN PATENT DOCUMENTS

GB 2518807 4/2015

OTHER PUBLICATIONS

PCT/US16/55223, Search Report and Written Opinion, dated Feb. 23, 2017, 11 pages.

* cited by examiner

*Primary Examiner* — Alexander M Weddle

(74) *Attorney, Agent, or Firm* — Cesari & Reed, LLP; R. Michael Reed

(57) ABSTRACT

In certain embodiments, an apparatus may be configured to spray a plurality of layers of paint onto a substrate through a plurality of iterations to produce a workpiece formed of a plurality of layers of paint. In some embodiments, the apparatus may include a cutting blade coupled to the apparatus and configured to cut the workpiece into a plurality of portions.

15 Claims, 10 Drawing Sheets

PAINT REPURPOSING SYSTEM

CROSS-REFERENCE TO RELATED APPLICATION(S)

The present disclosure is a non-provisional of and claims priority to U.S. Provisional Patent Application No. 62/237,372 filed on Oct. 5, 2015 and entitled "Paint Repurposing System", which is incorporated herein by reference in its entirety.

FIELD

The present disclosure is generally related to recycling or repurposing of household hazardous waste items, such as paint.

BACKGROUND

Disposal of household hazardous wastes (HHW) or home generated special materials (HGSM) can be complicated. HEW or HGSM refer to materials that may be harmful to the environment, and governmental organizations typically adopt rules that mandate that such materials cannot be discarded in ordinary trash. Such HEW may include automotive products (e.g., antifreeze, fluids, motor oil, oil filters, gasoline, polish, wax, and so on), batteries, electronics, fluorescent light bulbs, household cleaners, paint products, garden chemicals, sharp implements, swimming pool chemicals, and other products deemed hazardous (such as items that include mercury, such as thermometers, thermostats, and the like). Proper disposal of such materials may require a scheduled pickup by municipal employees or transportation to an HEW disposal facility, depending on the particular regulations.

SUMMARY

In certain embodiments, an apparatus may be configured to repurpose paint products. For example, the apparatus may be configured to spread out the paint products to dry and process the dried paint products to produce one or more workpieces that may be cut or shaped for a selected purpose.

In other embodiments, an apparatus may be configured to spray a plurality of layers of paint onto a substrate through a plurality of iterations to produce a workpiece formed of a plurality of layers of paint. In some aspects, the apparatus may be configured to cut the workpiece into sections or portions.

In some embodiments, a system may include a reservoir configured to hold paint and a sprayer coupled to the reservoir and configured to spray the paint onto a surface. The system may also include a controller circuit configured to selectively control a position of the sprayer relative to the substrate and to selectively deliver the paint to the surface to produce a workpiece formed of a plurality layers of the paint.

In other embodiments, a method can include automatically applying paint to a substrate, one layer at a time, using a paint repurposing apparatus. The method may further include automatically drying the paint, one layer at a time, to form a workpiece having multiple layers of the paint and removing the workpiece from the substrate.

In still other embodiments, a system can include a reservoir configured to hold paint and a structure including a crossbar extending parallel to a substrate to be painted and including at least one frame element extending substantially perpendicular to the substrate. The structure may be configured to move back in forth relative to the substrate and in a direction that is substantially perpendicular to the crossbar. The system can further include a sprayer coupled to the reservoir and configured to direct paint toward a substrate. Additionally, the system may include a transverse alignment mechanism coupled to the crossbar and to the sprayer. The transverse alignment mechanism may be configured to move the sprayer back and forth along the crossbar.

In some embodiments, the apparatus may paint the substrate to form a plurality of paint layers. The layers of paint may be cured (dried) to form a workpiece. In some aspects, a cutting device may cut the workpiece into a plurality portions.

In other embodiments, an atmospheric detection system that measures humidity, barometric pressure and temperature can inform the circuit as to the rate at which paint material can be deposited.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

In some instances, municipalities may provide recommendations or impose rules for proper disposal of paint products, such as latex paint. In an example, some municipalities may provide a hazardous waste facility to which paint products may be delivered for disposal. In another example, some municipalities may recommend that the user dry out the paint product before disposing of the dried paint product in the trash.

Embodiments of systems, methods, and devices are described below that facilitate recycling or repurposing of household hazardous waste products and, in particular, paint products, such as latex paint. In certain embodiments, landscape pavers, bricks, the systems, methods, and devices may be configured to paint a substrate with a series of thin layers of paint, one on top of the next, to produce a workpiece formed from a plurality of layers of paint. The workpiece may be separated from the substrate and may be cut or otherwise processed to repurpose the dried paint workpiece for another use.

In certain embodiments, the dried paint workpiece may be used as a substrate that can be processed to produce artistic carvings, rubber (latex) shavings for use in artificial turf environments, and so on. The paint-based workpieces can be repurposed for a variety of applications, and the examples listed are illustrative only and not intended to be limiting.

By drying layers of paint, one on top of another to form the workpiece, the environment is protected from paint contamination, which might otherwise occur if the paint were discarded into a landfill and the liquid paint were allowed to leach into the soil. Further, by drying the paint for repurposing, hazardous household waste (MW) disposal facilities can avoid the costs associated with incineration of the discarded paint. Moreover, the MW disposal facility may be able to sell the repurposed paint (for example, by cutting the workpiece into smaller portions that can be sold as a filler material) to increase revenue. Other advantages may be apparent to those of skill in the art in light of the present disclosure. One possible example of a method of repurposing paint is described below with respect to FIG. 1.

Figure 1:
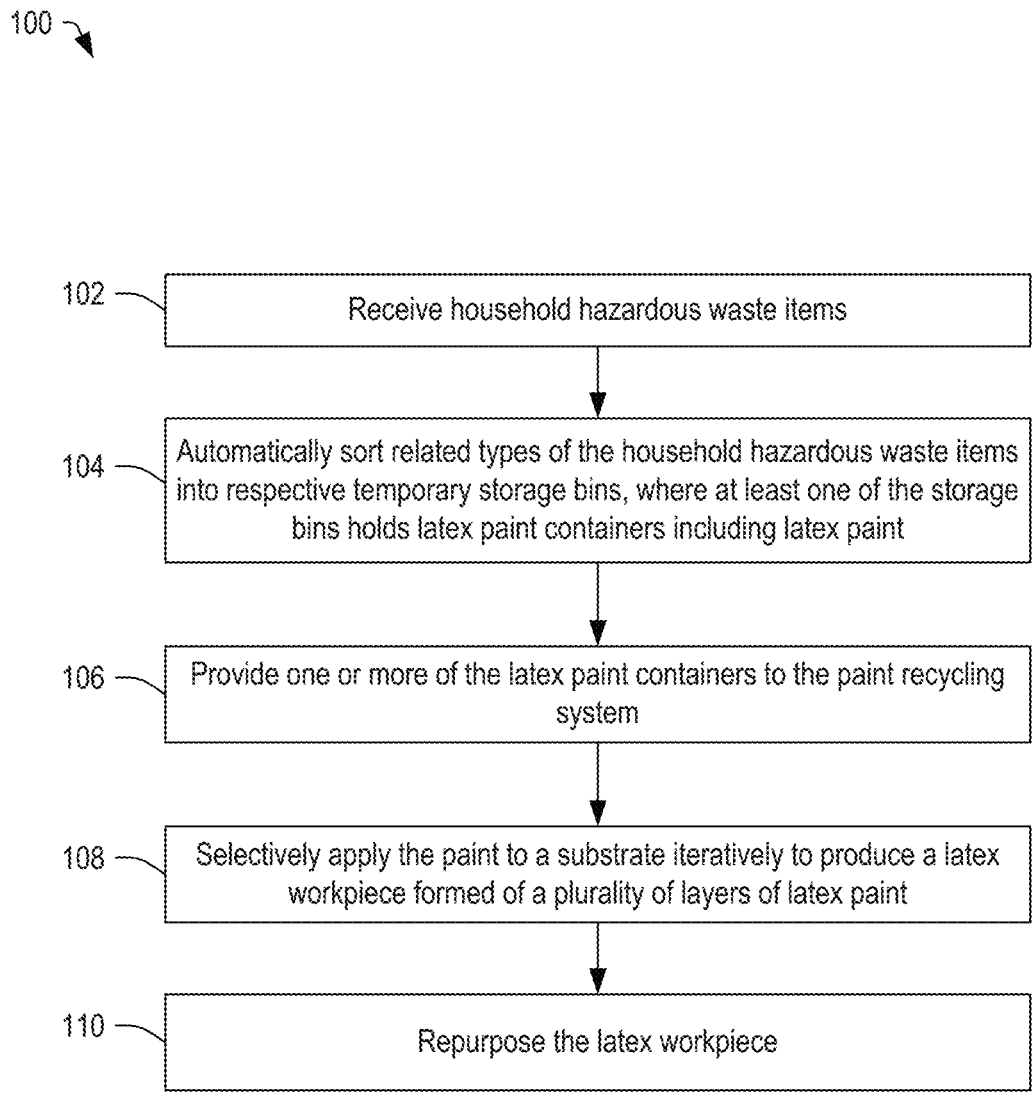
FIG. 1 depicts a flow diagram of a method of repurposing paint, in accordance with certain embodiments of the present disclosure.

FIG. 1 is a flow diagram of a method 100 of repurposing paint, in accordance with certain embodiments of the present disclosure. The method 100 may include receiving an MW item, at 102. The MW item may be received at an HHW disposal facility or at another location. MW items may include any number of waste products that have prescribed disposal rules that prohibit disposal in a landfill.

In certain embodiments, the method 100 may further include automatically sorting related types of the MW items into respective temporary storage bins, where at least one of the storage bins holds latex paint containers including latex paint, at 104. In certain embodiments, the sorting may be performed by a sorting system including a conveyor system configured to convey HHW items through an optical scanner, which may scan the product and process images of the product to determine the type of the MW item. In some embodiments, identified products may be sorted into a bin of similar products. In a particular example, the sorting system may include a conveyor and one or more moveable elements that can be used to guide the identified MW item into a bin for the particular type of product. Paint products including latex paint products, for example, may be sorted into a particular bin.

At 106, the method 100 may include providing one or more of the latex paint containers to the paint recycling system. The one or more latex paint containers may be extracted from the latex paint bin and may be delivered to a paint reservoir of the paint recycling system. The delivery may be automated, using robotic components, for example. In other embodiments, a palette or another transport mechanism for transporting latex paint containers may be delivered to the paint recycling system, and the individual cans may be removed and emptied into a reservoir associated with the paint recycling system. Alternatively, individual containers of latex paint may be coupled to an apparatus, which may be configured to spray paint onto a substrate in thin layers to facilitate formation of a multi-layer workpiece.

At 108, the method 100 may include selectively applying the paint to a substrate iteratively to produce a latex workpiece formed of a plurality of layers of paint. In certain embodiments, an automated painting system may be configured to spray thin layers of paint onto a substrate using a spray element. In certain embodiments, the automated painting system may include a movable element coupled to the spray element and configured to move side to side (transverse to a longitudinal axis of a substrate). Further, the automated painting system may be configured to move along a longitudinal axis of the substrate (back and forth along a length of the substrate) so that the paint may coat the substrate. The automated painting system may apply the layer of paint across the substrate and then may reset its position and repeat the application process iteratively. With each of the iterations, the paint may be applied to an underlying layer of paint and the layers may dry to form the latex workpiece. In some embodiments, the apparatus may have a fixed position, and the substrate may be coupled to a conveyor system that can position the substrate relative to the apparatus. Other embodiments are also possible.

At 110, the method 100 may also include repurposing the latex workpiece. In certain embodiment, the latex workpiece may be separated from the substrate (such as by bending the substrate, scraping the latex workpiece from the substrate, or any combination thereof. Further, the latex workpiece may be cut into blocks or may be carved into small pieces or portions, which may be used for other purposes. In certain embodiments, the workpiece may be chopped into small pieces, which may be applied, for example, to artificial turf to soften the surface for sliding, tackling, and other athletic maneuvers. In other embodiments, the portions may be gathered in a bag and sold as filler material. Other uses and other embodiments are also possible.

In certain embodiments, prior to formation of a latex workpiece, the paint may be recovered from a disposal facility, such as a hazardous household waste disposal facility. In certain embodiments, the recovery may be made by an automated system configured to identify paint containers as compared to other household waste products and to separate the paint containers into a particular storage bin. In certain embodiments, the recovered paint may be provided to a paint repurposing system, such as the paint purposing system described below with respect to FIG. 2.

Figure 2:
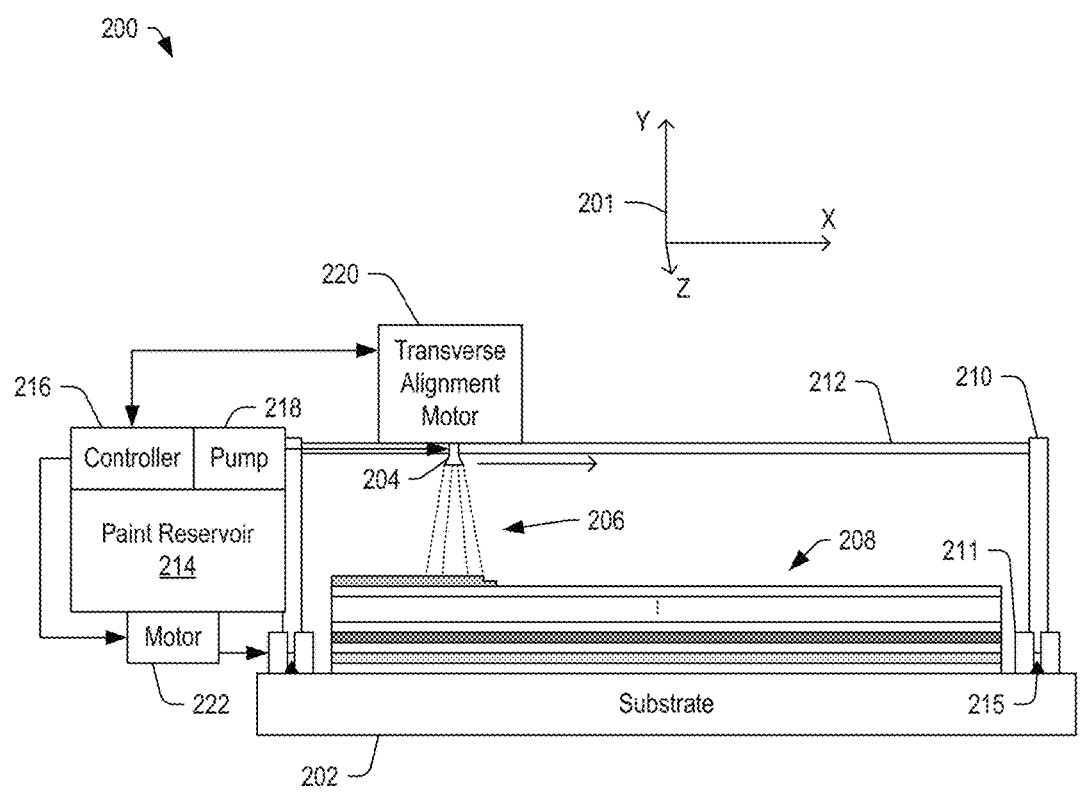
FIG. 2 illustrates a block diagram of a paint repurposing system, in accordance with certain embodiments of the present disclosure.

FIG. 2 is a block diagram of a paint repurposing system 200, in accordance with certain embodiments of the present disclosure. The paint repurposing system 200 may include a substrate 202 and a paint sprayer 204 positioned above the substrate 202. The paint sprayer 204 may be configured to spray paint (generally indicated at 206) onto the substrate 202, one layer at a time, to form a workpiece 208 formed from a plurality of layers of paint.

The paint repurposing system 200 may include frame elements 210 having wheels 211 configured to move the frame 210 along a track 215. The frame elements 210 may extend substantially vertically relative to the substrate 202. Further, the frame 210 may include a crossbar 212 extending horizontally over the substrate 202. The paint sprayer 204 may be coupled to the crossbar 212 and configured to move back and forth across the crossbar 212.

The paint repurposing system 200 may further include a paint reservoir 214 and a controller circuit 216. The controller circuit 216 may be coupled to a pump 218, which may be positioned between the paint reservoir 214 and the paint sprayer 204. Further, the controller circuit 216 may be coupled to a sprayer alignment mechanism, such as a transverse alignment motor 220, which may be coupled to the paint sprayer 204 and which may be configured to move the paint sprayer 204 along the crossbar 212 in response to control signals from the controller circuit 216. The controller circuit 216 may also be coupled to a motor 222, which may be coupled to at least one wheel 211 and which may cause the wheel 211 to rotate to move the apparatus in a z-direction along a length of the substrate 202 in response to control signals from the controller circuit 216. The wheels 211 may engage tracks 215 to maintain a consistent alignment in the z-direction. In certain embodiments, the transverse alignment motor 220 may move the paint sprayer 204 side to side (along an x-axis of the axis 201) and transverse to a direction of travel of the frame elements 210 (i.e., the z-direction).

In an example, the paint repurposing system 200 may move along a length of the substrate 202 while the sprayer 204 moves back and forth along the crossbar 212 (back and forth across the substrate 202) to coat a portion of the substrate 202 with a thin layer of paint. The thin paint layer may be allowed to dry and then the paint repurposing system 200 may apply a next layer of paint. The paint repurposing system 200 may spray a plurality of layers, one layer at a time, onto the substrate 202 to form a workpiece 208 that can be separated from the substrate 202 and then repurposed (either sold as a multi-layer block or cut into portions). In the illustrated example, the workpiece 208 may include a plurality of paint layers. Other embodiments are also possible.

Figure 3:
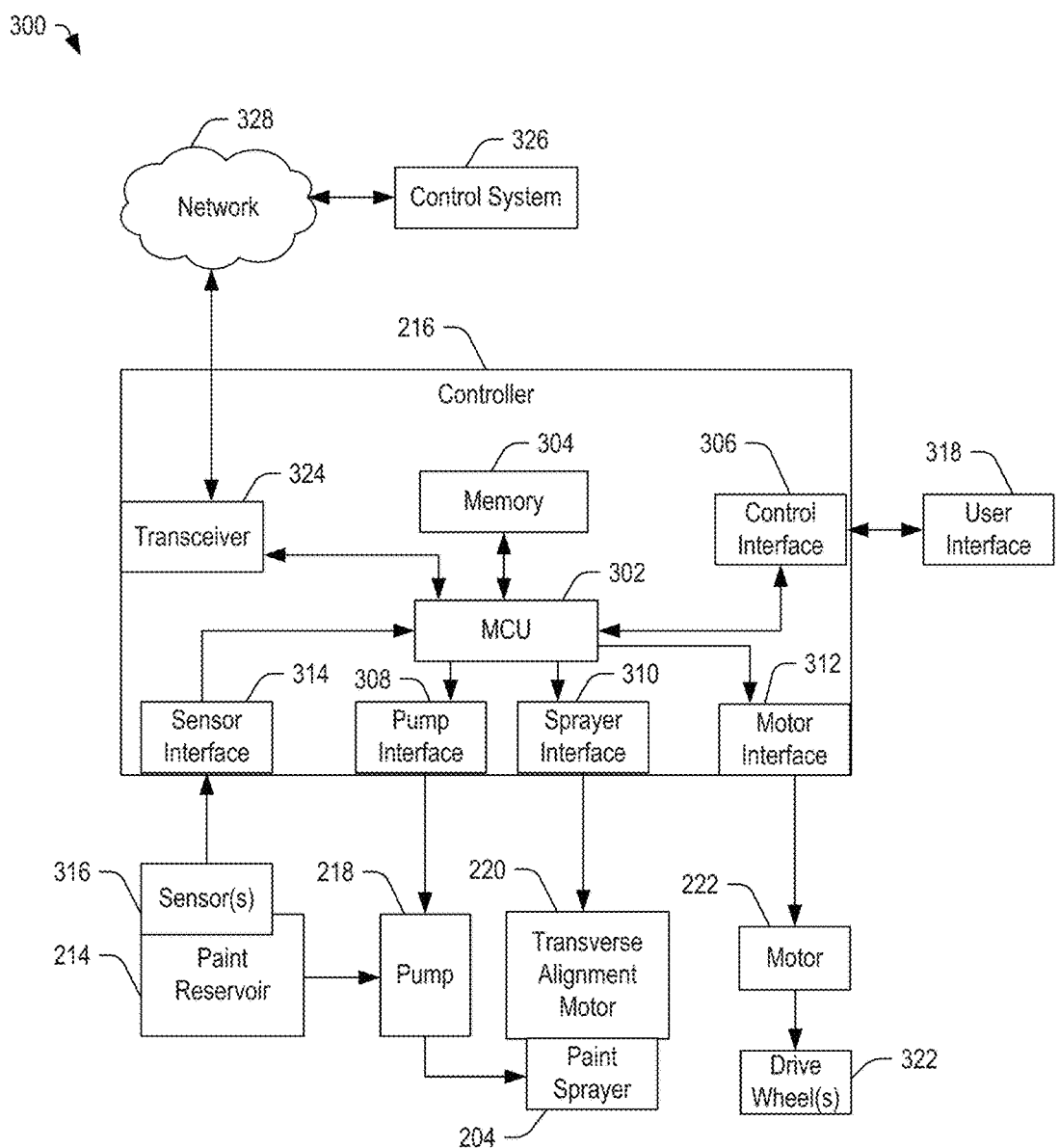
FIG. 3 depicts a block diagram of a paint repurposing system, in accordance with certain embodiments of the present disclosure.

FIG. 3 is a block diagram of a paint repurposing system 300, in accordance with certain embodiments of the present disclosure. In certain embodiments, the paint repurposing system 300 may be an embodiment of and may include all of the elements of the paint repurposing system 200 of FIG. 2. The paint repurposing system 300 may include the controller circuit 216 including a microcontroller circuit unit (MCU) 302 coupled to a memory 304. The MCU 302 may be coupled to a control interface 306, a pump interface 308, a sprayer interface 310, and a motor interface 312. Further, the MCU 302 may be coupled to a sensor interface 314 and to a transceiver 324.

The paint repurposing system 300 may include one or more sensors 316 coupled to the sensor interface 314 and at least one of the one or more sensors 316 may be coupled to the paint reservoir 214. In certain embodiments, the one or more sensors 316 may include a sensor configured to detect the fill level of the paint reservoir 214. Other sensors may also be included, such as optical sensors configured to detect an edge of the substrate, a paint flow sensor to measure paint flow through the sprayer 204, a viscosity sensor configured to measure a viscosity of the paint in the paint reservoir 214, and so on. In some embodiments, an atmospheric sensor or detection system can be coupled to the sensor interface 314 and configured to measure humidity, barometric pressure and temperature, which measurements can be used to inform the MCU 302 as to the rate at which paint material can be deposited on the substrate.

The paint repurposing system 300 may further include the pump 218 coupled to the paint reservoir 214 and to the pump interface 308. The pump 218 may also be coupled to the paint sprayer 204, both of which may be controlled by the MCU 302. The paint sprayer 204 may be coupled to the transverse alignment motor 220, which may be coupled to the sprayer interface 310. The paint repurposing system 300 may also include the motor 222 coupled to the motor interface 312 and coupled to one or more drive wheels 322, which may be configured to move the frame 210 and the associated crossbar 212 relative to the substrate 202 (in FIG. 2).

The paint repurposing system 300 may further include a user interface 318 coupled to the control interface 306. The user interface 318 may include buttons, switches, dials, or user-selectable features accessible by a user to adjust operation of the system. In some embodiments, the user interface 318 may include a touchscreen through which a user may configure the controller circuit 216.

In certain embodiments, the controller circuit 216 may include a transceiver 324 coupled to the MCU 302 and configured to communicate with a network 328. In certain embodiments, the transceiver 324 may send data to a control system 326 via the network 328 and may receive data, control signals, and other data from the control system 326. In an example, the transceiver 324 may receive updated instructions sets, firmware, or programs to be executed by the MCU 302 and which may be stored in the memory 304. In an example, the MCU 302 may cause the transceiver 324 to communicate data related to the sensed paint level within the paint reservoir 214 to the control system 326, the data constituting an alert to notify an automated system or to notify personnel of the need for more paint to be added to the paint reservoir 214. In some embodiments, the data may provide an alert regarding a calculated thickness of the paint-layered workpiece or other parameters. Other embodiments are also possible. In certain embodiments, the controller circuit 216 may receive updated instructions, programs, or other information from the control system 326 via the network 328 using the transceiver 324. Data, instructions, schedules of operation, and other information may be stored in the memory 304.

In certain embodiments, the MCU 302 may control the pump 218 via the pump interface 308 to deliver paint from the paint reservoir 214 to the paint sprayer 204. Additionally, the MCU 302 may control the transverse alignment motor 220 via the sprayer interface 310 to position the paint sprayer 204 relative to the substrate. Further, the MCU 302 may control the motor 222 via the motor interface 312 to move the frame elements 210 relative to the substrate 202 using the one or more drive wheels 322.

In general, the transverse alignment motor 220 may be implemented in a variety of ways. In some embodiments, the transverse alignment motor 220 may include wheels configured to ride along a track on a surface of the crossbar 212. In other embodiments, the transverse alignment motor 220 may move back and forth using a string, a chain, or another feature. In still other embodiments, the transverse alignment motor 220 may include a gear configured to engage corresponding features on the crossbar 212 to advance the transverse alignment motor 220 in a selected direction. One possible example of a paint repurposing system including a rotatable gear configured to engage teeth disposed on an upper surface of the crossbar 212 is described below with respect to FIG. 4.

Figure 4:
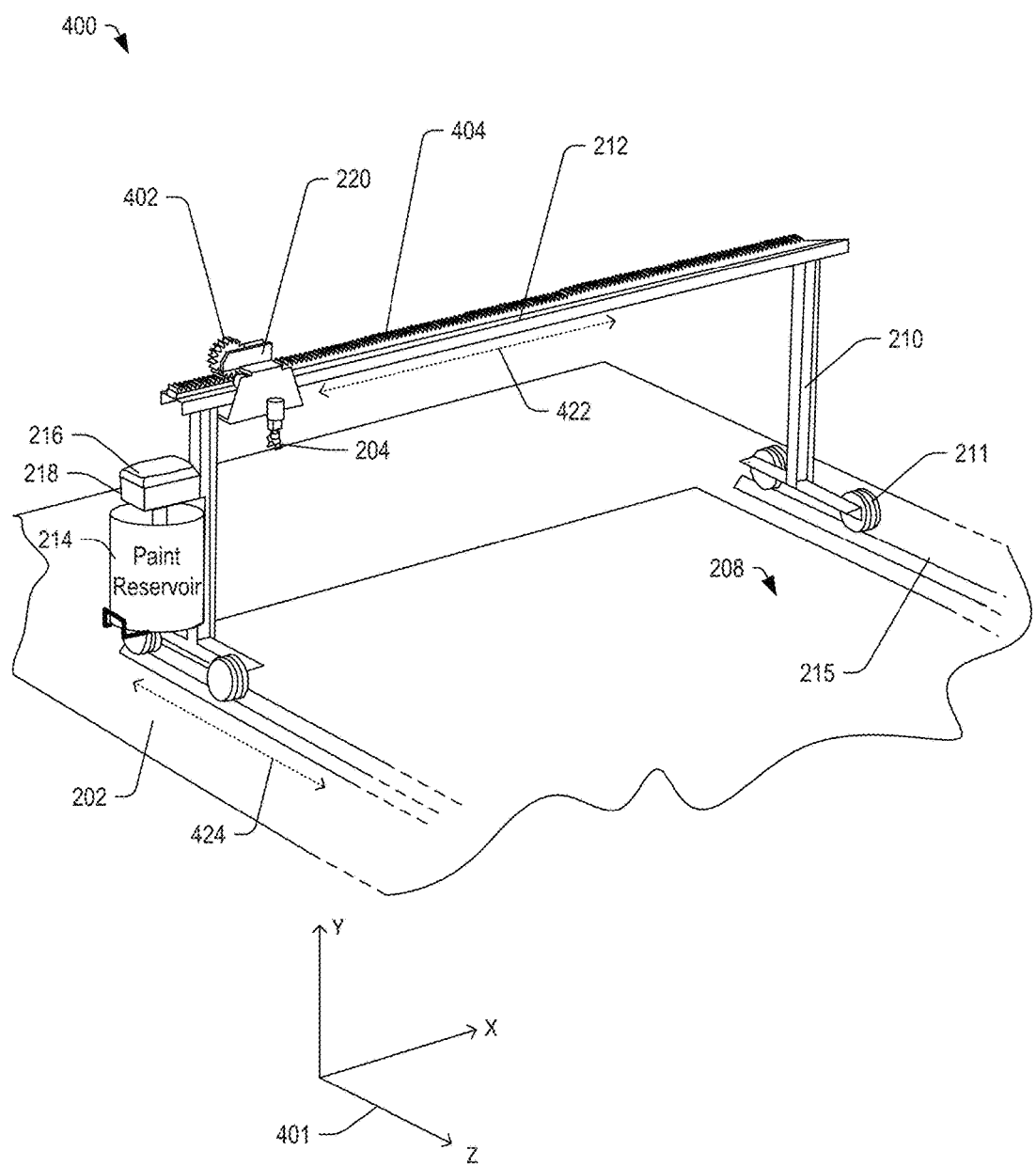
FIG. 4 depicts a perspective view of a paint repurposing system, in accordance with certain embodiments of the present disclosure.

FIG. 4 is a perspective view of a paint repurposing system 400, in accordance with certain embodiments of the present disclosure. The paint repurposing system 400 may be an embodiment of the paint repurposing systems of any of FIGS. 1-3. The paint repurposing system 400 includes a frame having a crossbar 212 and frame elements 210. The paint repurposing system 400 further includes wheels 211 configured to engage tracks 215 on either side of the substrate 202. The paint repurposing system 400 may also include the paint reservoir 214, the controller circuit 216, and the pump 218.

The transverse alignment motor 220 may include a gear 402 including teeth configured to mate with corresponding teeth or grooves 404 disposed as a track on an upper surface of the crossbar 212. In certain embodiments, the controller circuit 216 may send control signals to the transverse alignment motor 220, which may cause the transverse alignment motor 220 to rotate the gear 402, which has teeth or cogs configured to mesh with the teeth or grooves 404 disposed as a track on an upper surface of the crossbar 212 to transmit torque to move the transverse alignment motor 220 along the crossbar 212. By rotating the gear 402, the transverse alignment motor 220 can move the position of the paint sprayer 204 in the plus or minus X-direction as defined by the axis 401.

In an example, the controller circuit 216 may control the transverse alignment motor 220 to advance the sprayer 204 back and forth along the crossbar 212 to apply paint on the substrate 202 as indicated by arrow 422. The transverse alignment motor 220 may turn the gear 402 in a first direction for a pre-determined distance and may turn the gear 402 in a second direction for the pre-determined distance. In some embodiments, the sprayer 204 may deposit paint onto the substrate 202 when the gear 402 is turning in a first direction. Once the pre-determined distance (or position) is reached, the controller circuit 216 may send control signals to temporarily turn off the pump 216 and the sprayer 204 and to turn the wheel 211 to advance the apparatus 400 along the track 215 for a pre-determined distance (approximately equal to a spray radius of the paint). Once the apparatus 400 is moved by the pre-determined distance, the controller circuit 206 may send control signals to turn on the pump 216 and the sprayer 204 and to activate the transverse alignment motor 220 to turn the gear 402 in a second direction. This process can be repeated until the substrate 202 is coated, and then the apparatus 400 can be moved back to its starting position and the process may be repeated to apply multiple layers of paint to the substrate 202.

Figure 5:
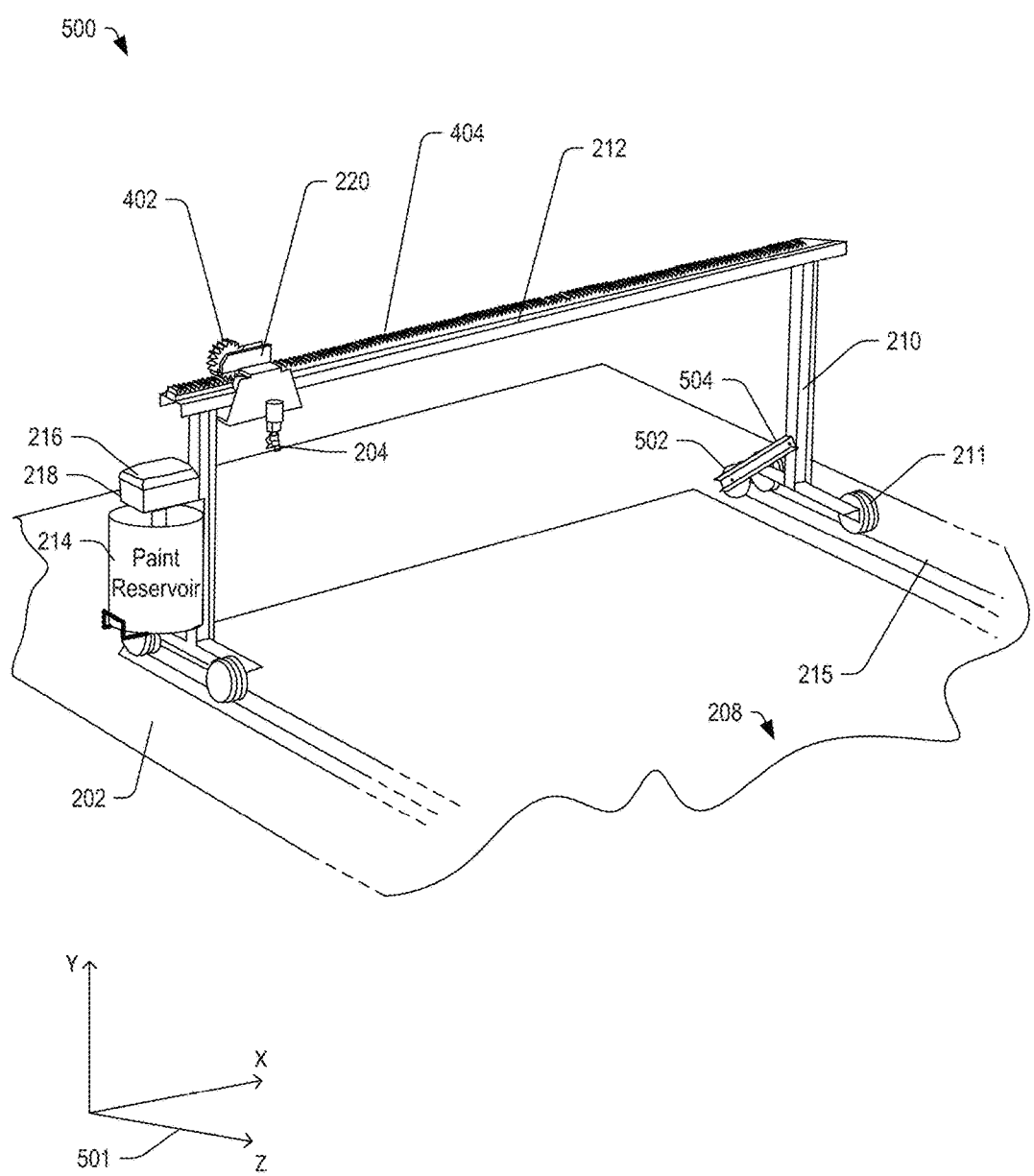
FIG. 5 depicts a perspective view of a paint repurposing system, in accordance with certain embodiments of the present disclosure.

FIG. 5 is a perspective view of a paint repurposing system 500, in accordance with certain embodiments of the present disclosure. The paint repurposing system 500 may be an embodiment of the paint repurposing systems of any of FIGS. 1-4, and may include any or all of the elements described therein. Further, the paint repurposing system 500 may include a drive wheel 502 coupled to a motor 222 (or another motor), which may be responsive to control signals from the controller circuit 216 to advance the apparatus in a Z-direction as indicated by the axis 501.

In the illustrated example, a drive wheel 502 may be provided on each side of the apparatus. Further, the drive wheels 502 may be separate from the wheels 211, which may allow the wheels 211 to utilize the track for alignment while controlling the drive wheel 502 to move the device in the plus or minus Z-direction. Further, the apparatus may include a support member 504 extending at an angle of approximately 35 degrees from the frame elements 210 toward the drive wheel 502, providing additional support. Additionally, the transverse alignment motor 220 may include the gear 402 including teeth configured to mate with corresponding teeth or grooves 404 on the crossbar 212.

In the illustrated example, the position of transverse alignment motor 220 is moved in the X-direction as compared to the position in FIG. 4. It should be appreciated that the motor of the transverse alignment motor 220 may rotate the gear 402 in either direction to reposition the paint sprayer 204 in the X-direction, as indicated by the axis 501.

Figure 6:
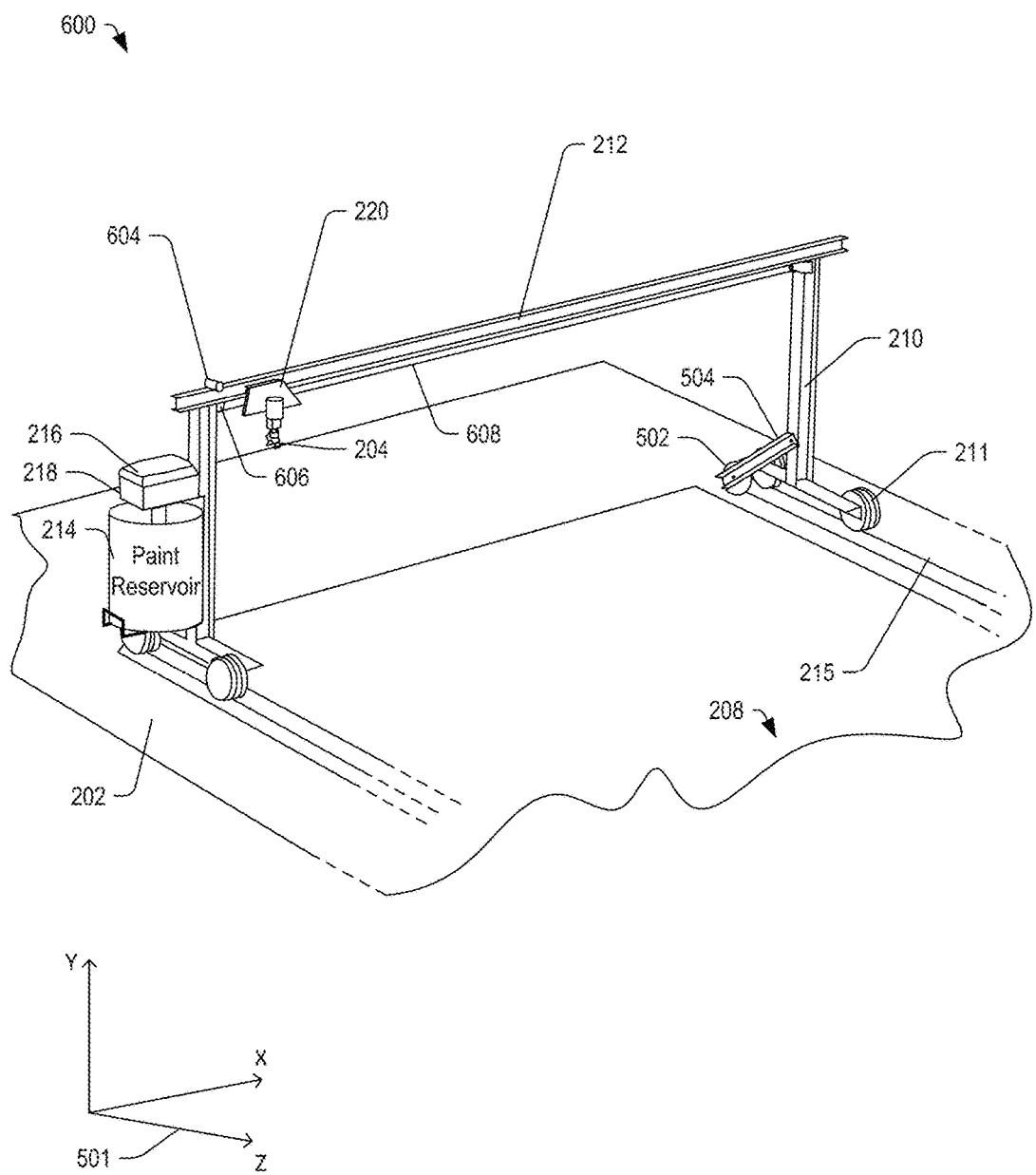
FIG. 6 depicts a perspective view of a paint repurposing system, in accordance with certain embodiments of the present disclosure.

FIG. 6 is a perspective view of a paint repurposing system 600, in accordance with certain embodiments of the present disclosure. The paint repurposing system 600 may be an embodiment of the paint repurposing systems of any of FIGS. 1-5, and may include any or all of the elements described therein. Further, the paint repurposing system 600 may include the drive wheel 502 coupled to a motor 222, which may be responsive to control signals from the controller circuit 216 to advance the apparatus in a Z-direction as indicated by the axis 601. Additionally, the frame may include the support member 504.

In the illustrated example, a chain, line or string 608 is provided between the frame elements 210 and coupled to pulleys, such as a pulley 606. The paint repurposing system 600 may also include a drive pulley motor 604 coupled to the string 608 and configured to advance or retract the string 608 to position a transverse alignment mechanism 220 in an X-direction relative to the axis 601. In some embodiments, the transverse alignment mechanism 220 may include a motor.

Figure 7:
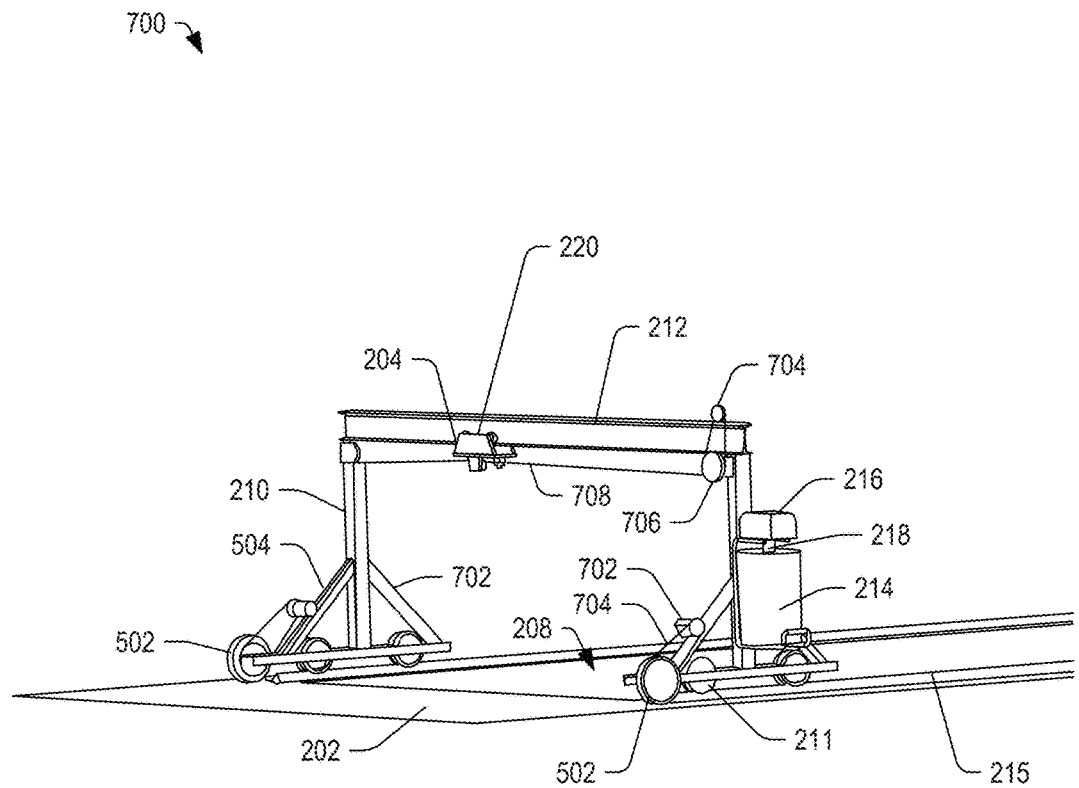
FIG. 7 depicts a perspective view of a paint repurposing system, in accordance with certain embodiments of the present disclosure.
Figure 7:
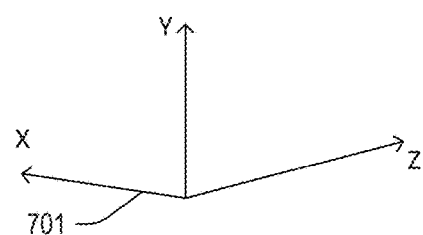

FIG. 7 is a perspective view of a paint repurposing system 700, in accordance with certain embodiments of the present disclosure. The paint repurposing system 700 includes all of the elements of the paint repurposing system 600 in FIG. 6. Further, the drive pulley 604 is shown, which may be controlled by the controller circuit 216 to rotate the pulley 606 in order to advance or retract the string to move the transverse alignment motor 220 in the plus or minus X-direction.

In certain embodiments, the support member 504 and drive wheel 502 may be provided on both sides of the apparatus. Further, a motor 702 may be mounted to the support member 504 (on one or both sides) and coupled to the drive wheel 502 by a chain or line 704 to selectively rotate the drive wheel 502 to selectively move the apparatus (i.e., frame elements 210) in the plus or minus Z-direction. In certain embodiment, the chain or line 704 may interface with gears on the drive wheel 502 and on the motor 702 to selectively apply torque to the drive wheel 502 to rotate to move the frame in the Z-direction.

Figure 8A:
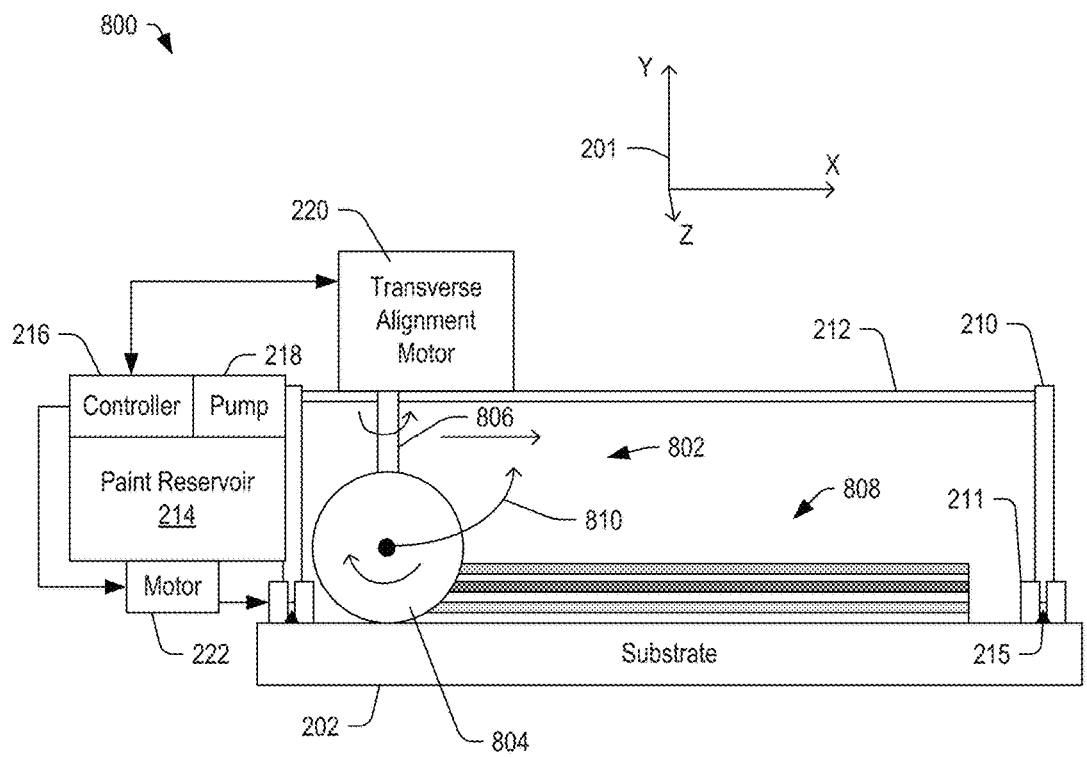
FIG. 8A depicts a block diagram of a paint repurposing system including a cutting blade, in accordance with certain embodiments of the present disclosure.

FIG. 8A is a block diagram of a paint repurposing system 800 including a cutting blade 804, in accordance with certain embodiments of the present disclosure. In certain embodiments, after the sprayer 204 has dispersed a plurality of layers of paint onto the substrate 202 to produce the workpiece 808, a cutting attachment 802 may be coupled to the transverse alignment motor 220. In certain embodiments, the cutting attachment 802 may include the cutting blade 804 and an extension arm 806, which may extend from the transverse alignment motor 220 toward the workpiece 808.

In certain embodiments, the transverse alignment motor 220 may position the cutting blade 804 relative to the workpiece 808 and may move the cutting blade 804 (as it rotates) in an x-direction to cut transverse slices through the workpiece 808. The controller circuit 216 may control both the position of the cutting blade 804 and the rotation of the cutting blade 804. In some embodiments, an additional motor may be included to power rotation of the cutting blade 804.

Once the slice is formed through the workpiece 808 from a first edge to a second edge, the cutting blade 804 may be raised, as generally indicated by the arrow 810 or in substantially opposite direction (not shown), and the assembly may be moved a distance ($d_Z$) in the Z-direction (as indicated by the axis 201). The cutting blade 804 may then be lowered and a slice may be produced from the second edge to the first edge. Alternatively, the cutting blade 804 may be returned to a start position before being lower to slice the workpiece 808 from the first edge to the second edge at a different location along the substrate. The process may be repeated iteratively producing a plurality of transverse slices in the workpiece 808. Once the transverse slices have been produced, the cutting attachment may be rotated ninety-degrees, and slices may be formed by moving the assembly back and forth in the z-direction while the cutting blade 804 rotates. The cutting blade 804 may be raised and the assembly may then be moved a distance ($d_x$) in the X-direction (as indicated by the axis 201). The cutting blade 804 may be lowered and the assembly may then be moved in the Z-direction to cut another slice in the workpiece 808. By cutting in both the x-direction and the z-direction, the workpiece 808 may be carved into bricks or blocks, which may be repurposed.

In certain embodiments, the workpiece 808 may be formed from latex paint. The workpiece 808 may be relatively soft and capable of being cut with a thin rotating sawblade. In some embodiments, the cutting blade 804 may include teeth configured to cut through the material of the workpiece 808.

In certain embodiments, there may be adequate space between the edges of the workpiece 808 and the frame of the assembly to permit the cutting blade 804 to be moved in the z-direction (or X-direction) between slices without having to raise and lower the cutting blade 804. In other embodiments, the cutting blade 804 may be raised and lowered as needed to carve the workpiece 808. In certain embodiments, a hinge and a transducer may be provided within the transverse alignment motor 220 to facilitate such movements, automatically. In other embodiments, the raising and lowering of the cutting blade 804 may be performed manually.

Figure 8B:
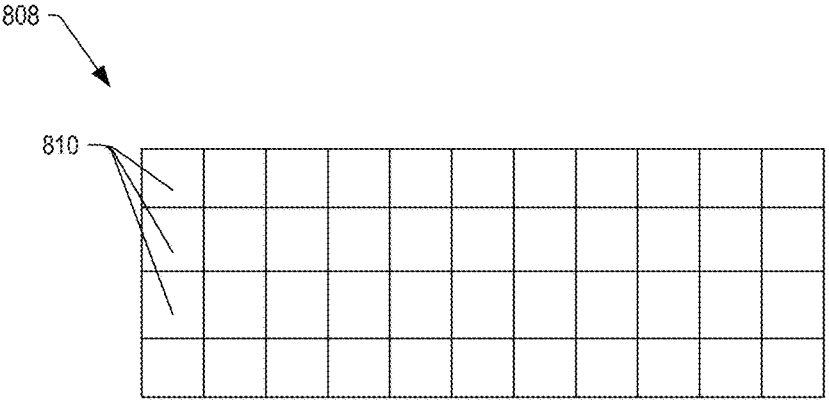
FIG. 8B depicts a block diagram of a work piece carved into sections using the cutting blade of the paint repurposing system in FIG. 8A, in accordance with certain embodiments of the present disclosure.

FIG. 8B is a block diagram of a work piece 808 carved into sections or portions 810 using the cutting blade 804 of the paint repurposing system 800 in FIG. 8A. In some embodiments, the cutting blade 804 may be oriented in a first orientation and the cutting blade 804 may be moved in a first direction. Then the paint repurposing system 800 may be moved in a second direction normal to the first direction. The cutting blade may then be moved in back in the first direction. To perform the transverse cuts, the orientation of the cutting blade 804 may be changed by 90 degrees and the paint repurposing system 800 may be moved back and forth in the second direction. The cutting blade 804 may be indexed by moving the blade in the first direction each time the paint repurposing system 800 reaches the end of the workpiece 808. Other embodiments are also possible.

Figure 9A:
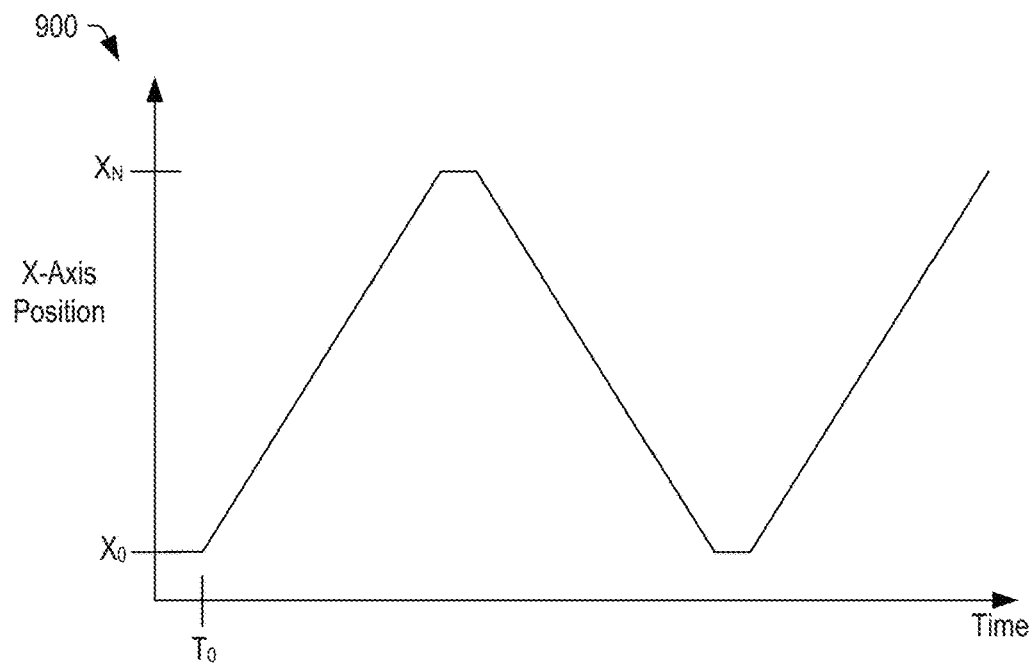
FIG. 9A depicts a graph of position in an X-direction versus time for a spray nozzle of a paint repurposing system, in accordance with certain embodiments of the present disclosure.

FIG. 9A is a graph 900 of position in an X-direction versus time for a spray nozzle of a paint repurposing system, in accordance with certain embodiments of the present disclosure. The graph 900 is labeled "x-axis position" on the vertical axis and the line representing the position varies substantially linearly between a first position ($X_0$) and a second position ($X_N$), which positions define a width of the latex paint workpiece. In certain embodiments, the line representing the position may increase linearly from the first position to the second position, and then, for a period of time corresponding to a z-direction movement of the apparatus, the position may remain unchanged. After the apparatus is finished moving, the position may decrease substantially linearly from the second position to the first position. Then, the position may remain substantially constant while the apparatus is again moved in the Z-direction. Once the apparatus is moved, the position may again increase linearly from the first position to the second position. When the apparatus reaches a pre-determined distance, which may correspond to a pre-determined length of the latex paint workpiece or the end of the substrate, the apparatus may move from the end of the latex paint workpiece to the beginning and then reposition the sprayer, repeating the process.

With each pass of the paint sprayer, the paint repurposing system applies a thin layer of latex paint to the substrate or to a previous paint layer. Over a plurality of applications, the layers may build up on one another to form a multi-layer workpiece. The workpiece may be separated from the underlying substrate and processed according to an intended application.

Figure 9B:
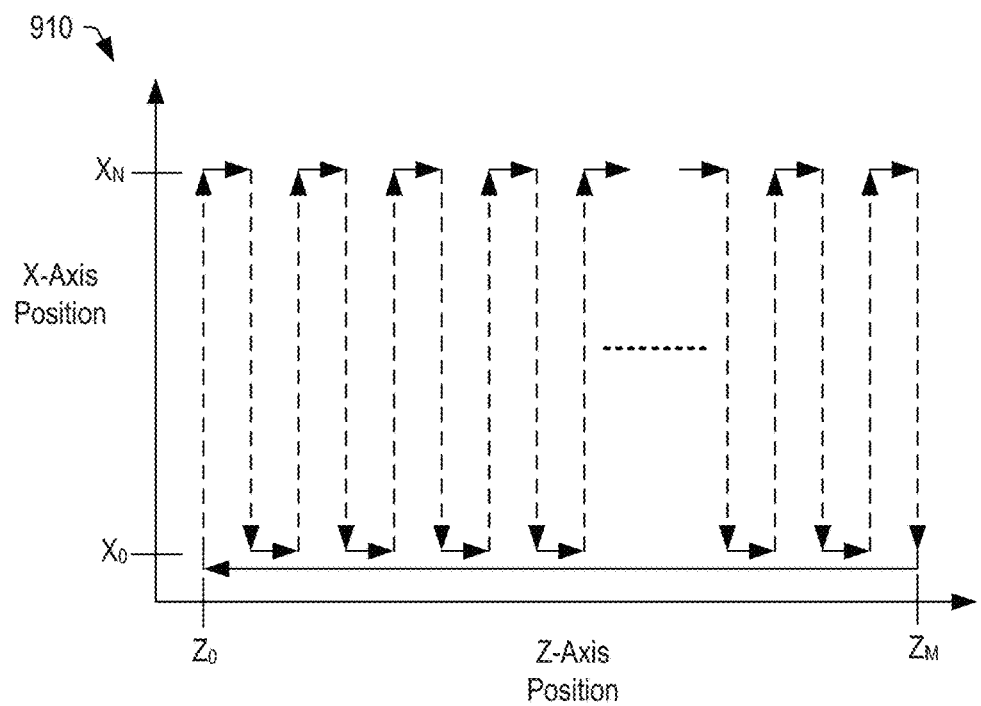
FIG. 9B depicts a graph of position in an X-direction versus position in a Z-direction showing an iteration of a paint layer formation process, in accordance with certain embodiments of the present disclosure.

FIG. 9B is a graph 910 of position in an X-direction versus position in a Z-direction showing an iteration of a paint layer formation process, in accordance with certain embodiments of the present disclosure. As shown by the graph 910, in certain embodiments, when the sprayer position is moved in an x-direction, the sprayer applies a layer of paint and the z-position of the sprayer is held substantially constant. In contrast, when the sprayer position is moved in a z-direction, the sprayer is off and the x-position of the sprayer is held substantially constant. The zig-zag pattern allows the sprayer to provide a substantially uniform paint layer across the substrate.

Additionally, with respect to the graph 910, the movements shown may be repeated for the transverse cutting operations with the cutting attachment 802 being used instead of the sprayer, as discussed with respect to FIG. 8. Further, the movements shown may be performed with respect to the Z-direction as well in order to slice the workpiece 808 into a plurality of rectangular bricks.

Figure 10:
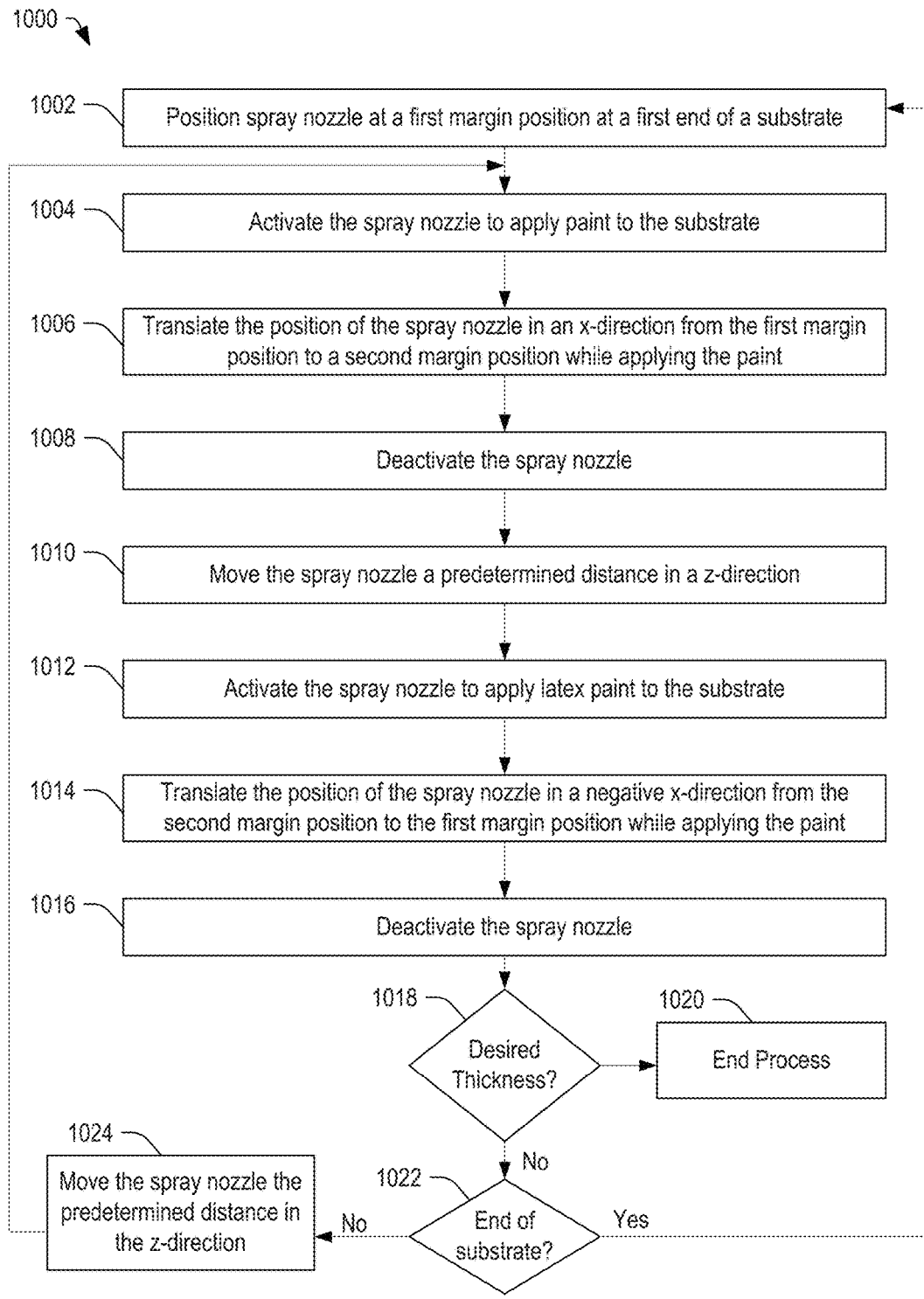
FIG. 10 illustrates a flow diagram of a method of repurposing paint, in accordance with certain embodiments of the present disclosure.

FIG. 10 is a flow diagram of a method 1000 of repurposing paint, in accordance with certain embodiments of the present disclosure. The method 1000 may include positioning a spray nozzle at a first margin position at a first end of a substrate, at 1002. The first margin position may be a start position or edge position, which may be defined by programmable settings that identify the desired size of the workpiece to be formed.

The method 1000 may also include activating the spray nozzle to apply paint to the substrate, at 1004. The method 1000 may further include translating the position of the spray nozzle in an x-direction from the first margin position to the second margin position while applying the paint, at 1006. The method 1000 may also include deactivating the spray nozzle, at 1008.

The method 1000 may also include moving the spray nozzle a predetermine distance in the Z-direction, at 1010. The method 1000 may further include activating the spray nozzle to apply latex paint to the substrate, at 1012. The method 1000 may then include translating the position of the spray nozzle in a negative x-direction from the second margin position to the first margin position while applying the paint. At 1016, the spray nozzle may be deactivated.

The method 1000 may include determining if the paint workpiece is at a desired thickness, at 1018. The desired thickness may be determined based on the intended application. In certain embodiments, the thickness may be determined based on the number of paint layers applied and based on an average flow rate of the paint. If the desired thickness is achieved, the method 1000 may include ending the paint application process, at 1020. Otherwise, at 1018, if the desired thickness is not reached, the method 1000 may include determining if the end of the substrate is reached, at 1022. If it has been, the method 1000 may return to 1002 to position the spray nozzle at the first margin position at the first end of the substrate. Otherwise at 1022, if the end of the substrate is not reached, the method 1000 may include moving the spray nozzle the predetermined distance in the z-direction. The method 1000 may return to 1004 to activate the spray nozzle to apply paint to the substrate.

In conjunction with the systems, methods and devices described above with respect to FIGS. 1-10, paint may be recycled from household hazardous waste products by spraying the paint onto a substrate, layer by layer, to form a paint workpiece. Each layer dries and the next layer is applied to the previous paint layer such that the paint layers build up to form a workpiece having a desired thickness. The workpiece may then be separated from the substrate and may be processed into a form suitable for its intended purpose. In certain embodiments, the paint repurposing apparatus may utilize a frame and motor elements to automatically position the sprayer and to automatically adjust the position of the apparatus relative to the substrate.

In certain embodiments, the paint repurposing apparatus may include a controller circuit (such as an MCU) configured to provide control signals to the motors to manage the position of the sprayer relative to the substrate in the X-direction and the Z-direction and to provide control signals to the pump to control paint flow to the sprayer. In certain embodiments, the controller circuit may communicate an alert to a control system when the paint level in the paint reservoir is low, when the workpiece has reached a desired thickness, when a malfunction is detected, or any combination thereof. In certain embodiments, the control system and the controller circuit may cooperate to apply selected colors to achieve a desired visual effect with respect to cross-sectional views of the paint workpiece.

While the above-discussion has focused on latex paint workpieces formed of layers of latex paint, other types of paint may be used to form workpieces. Further, in some embodiments, the substrate may be formed from a flexible material, which can be flexed or bent to separate the workpiece from the substrate. Other embodiments are also possible.

The systems, methods, and devices described above with respect to FIGS. 1-10 represent a significant improvement over traditional HHW disposal techniques. In particular, by applying paint to a substrate in thin layers, iteratively, a workpiece can be created that can be repurposed. The apparatus may be configured to at least partially automate the formation of a multi-layer workpiece. Further, in some embodiments, an interface of the device may be accessed by a user to configure the operation to cut the workpiece, to configure a number of layers (i.e., a thickness of the workpiece 808), and so on. Thus, the systems, methods, and devices described herein can be used to repurpose paint so that the cost of disposal can be reduced and the paint may be recycled. Other embodiments are also possible.

Although the present invention has been described with reference to preferred embodiments, workers skilled in the art will recognize that changes may be made in form and detail without departing from the scope of the invention.

What is claimed is:

1. A system comprising:
    a reservoir configured to hold paint;
    a sprayer coupled to the reservoir and configured to spray the paint onto a surface;
    a controller circuit configured to selectively control a position of the sprayer relative to the substrate and to selectively deliver the paint to the surface to produce a workpiece formed of a plurality layers of the paint; and
    a cutting attachment including a cutting blade configured to cut the workpiece;
    wherein the controller circuit is configured to selectively control a position and rotation of the cutting blade relative to the substrate to carve the workpiece into a plurality of portions.

2. The system of claim 1, further comprising:
    a structure configured to secure the reservoir, the sprayer, and the control circuit, the structure including:
    at least one frame element extending substantially vertically relative to the substrate; and
    a crossbar coupled to the at least one frame element.

3. The system of claim 2, further comprising:
    a drive wheel coupled to the structure; and
    a motor coupled to the drive wheel and to the controller circuit, the motor configured to turn the drive wheel to selectively adjust a position of the structure relative to the substrate.

4. The system of claim 2, further comprising a plurality of grooves on at least one surface of the crossbar.

5. The system of claim 4, further comprising a transverse alignment motor configured to couple the sprayer to the crossbar, the transverse alignment motor including a gear configured to engage one or more of the plurality of grooves and responsive to control signals from the controller circuit to move the sprayer relative to the crossbar to adjust a position of the sprayer relative to the substrate during operation.

6. The system of claim 2, further comprising;
    a first pulley positioned at a first end of the crossbar;
    a second pulley positioned at a second end of the crossbar;
    a string extending between the first pulley and the second pulley; and
    a transverse alignment mechanism coupled to the sprayer and to the string, the transverse alignment mechanism configured to selectively position the sprayer relative to the substrate during operation.

7. The system of claim 6, further comprising a motor coupled to one of the string and the transverse alignment mechanism and responsive to control signals from the controller circuit to adjust a position of the sprayer.

8. The system of claim 1, further comprising a pump coupled to the reservoir and responsive to the controller circuit to deliver paint to the sprayer.

9. An apparatus comprising:
    a reservoir configured to hold paint;
    a structure including a crossbar extending parallel to a substrate to be painted and including at least one frame element extending substantially perpendicular to the substrate, the structure configured to move back in forth relative to the substrate and in a direction that is substantially perpendicular to the crossbar;
    a sprayer coupled to the reservoir and configured to direct paint toward the substrate;
    a transverse alignment mechanism coupled to the crossbar and to the sprayer, the transverse alignment mechanism configured to move the sprayer back and forth along the crossbar; and
    a cutting attachment including a cutting blade configured to cut the workpiece.

10. The apparatus of claim 9, further comprising a controller circuit configured to automatically control movement of the structure and movement of the transverse alignment mechanism.

11. The apparatus of claim 10, further comprising a transverse alignment motor coupled to the transverse alignment mechanism and configured to adjust a position of the sprayer relative to the substrate in response to a control signal from the controller circuit.

12. The apparatus of claim 11, further comprising:
a plurality of grooves on at least one surface of the crossbar; and
the transverse alignment motor including a gear configured to engage one or more of the plurality of grooves to move the sprayer relative to the crossbar to adjust a position of the sprayer relative to the substrate during operation.

13. The apparatus of claim 11, further comprising;
a first pulley positioned at a first end of the crossbar;
a second pulley positioned at a second end of the crossbar;
a string extending between the first pulley and the second pulley; and
wherein the transverse alignment mechanism is coupled to the string and configured to selectively position the sprayer relative to the substrate during operation.

14. The apparatus of claim 10, further comprising:
a drive wheel coupled to the structure and configured to contact the substrate; and
a drive motor coupled to the drive wheel and responsive to a control signal from the controller circuit to selectively turn the drive wheel to move the apparatus relative to the substrate.

15. The apparatus of claim 9,
wherein the controller circuit is configured to selectively control a position and rotation of the cutting blade relative to the substrate to carve the workpiece into a plurality of portions.

* * * * *